(12) United States Patent
Pintos et al.

(10) Patent No.: US 7,889,138 B2
(45) Date of Patent: Feb. 15, 2011

(54) ELECTROMAGNETIC WAVE RECEPTION AND DECODING SYSTEM PROVIDED WITH A COMPACT ANTENNA

(75) Inventors: Jean-Francois Pintos, Bourgbarre (FR); Jean-Luc Robert, Betton (FR); Philippe Minard, Saint Medard sur Ille (FR); Ali Louzir, Rennes (FR)

(73) Assignee: Thomson Licensing, Boulogne-Billcourt (FR)

( * ) Notice: Subject to any disclaimer, the term of this patent is extended or adjusted under 35 U.S.C. 154(b) by 747 days.

(21) Appl. No.: 10/593,222

(22) PCT Filed: Mar. 15, 2005

(86) PCT No.: PCT/EP2005/051175

§ 371 (c)(1),
(2), (4) Date: Sep. 18, 2006

(87) PCT Pub. No.: WO2005/093903

PCT Pub. Date: Oct. 6, 2005

(65) Prior Publication Data

US 2007/0188389 A1 Aug. 16, 2007

(30) Foreign Application Priority Data

Mar. 22, 2004 (FR) .................................. 04 02955

(51) Int. Cl.
*H01Q 1/24* (2006.01)

(52) U.S. Cl. ................................ 343/702; 343/700 MS

(58) Field of Classification Search ................. 343/829, 343/846, 848, 882, 702, 726, 728, 845, 825, 343/826, 830, 831, 700 MS
See application file for complete search history.

(56) References Cited

U.S. PATENT DOCUMENTS

| | | | | |
|---|---|---|---|---|
| 2,604,593 A | * | 7/1952 | Trowbridge | ................. 343/805 |
| 3,929,908 A | | 12/1975 | Orlando et al. | |
| 3,987,448 A | * | 10/1976 | Scheppman | ................. 343/702 |
| 5,949,379 A | * | 9/1999 | Yang | .......................... 343/702 |
| 5,966,097 A | | 10/1999 | Fukasawa et al. | |

(Continued)

FOREIGN PATENT DOCUMENTS

DE 2236625 3/1973

(Continued)

OTHER PUBLICATIONS

Su, Saou-Wen, Kin-Lu Wong, Yuan-Tung Cheng and Wen-Shyang Chen, "Finite Ground Plane Effects on the Ultra Wideband Planar Monopole Antenna," Microwave and Optical Technology Letters, vol. 43, No. 6, Dec. 20, 2004.*

(Continued)

*Primary Examiner*—HoangAnh T Le
(74) *Attorney, Agent, or Firm*—Robert D. Shedd; Joseph J. Opalach; Brian J. Cromarty

(57) ABSTRACT

The invention relates to a data transmission system comprising an antenna provided with a monopole radiating element held in place by an earth plane provided with a conducting surface. According to the invention, the radiating element is located facing the surface of the earth plane so as to interact with the latter in order to improve its performance.

8 Claims, 17 Drawing Sheets

U.S. PATENT DOCUMENTS

| | | |
|---|---|---|
| 6,323,818 B1 | 11/2001 | Koh et al. |
| 6,445,348 B1 * | 9/2002 | McCoy et al. ............... 343/702 |
| 2002/0057226 A1 | 5/2002 | Koh et al. |

FOREIGN PATENT DOCUMENTS

| | | |
|---|---|---|
| FR | 2843239 | 2/2004 |
| GB | 2236625 | 4/1991 |
| JP | 56012102 | 2/1981 |
| JP | 62048109 | 3/1987 |
| JP | 06069715 | 3/1994 |
| JP | 09326632 | 12/1997 |
| JP | 2003051712 | 2/2003 |
| JP | 2003504902 | 2/2003 |
| JP | 2003124742 | 4/2003 |
| JP | 2003318639 | 11/2003 |
| WO | WO0103238 | 1/2001 |

OTHER PUBLICATIONS

B.J. Herting et al.: "Finite ground plane packaging effects on a dual-band PIFA" Conference Proceedings Article, Oct. 21, 2002, pp. 95-98.

S.H. Zainud-Deen et al.: "Analysis of Normal Mode Helical Antenna on Finite Ground Plane" IEEE Antennas and Propagation Society International Symposium Digest, Newport Beach, Jun. 18-23, 1995, vol. vol. 4, Jun. 18, 1995, pp. 1879-1882.

Search Report Dated Jun. 20, 2005.

* cited by examiner

FIG_1
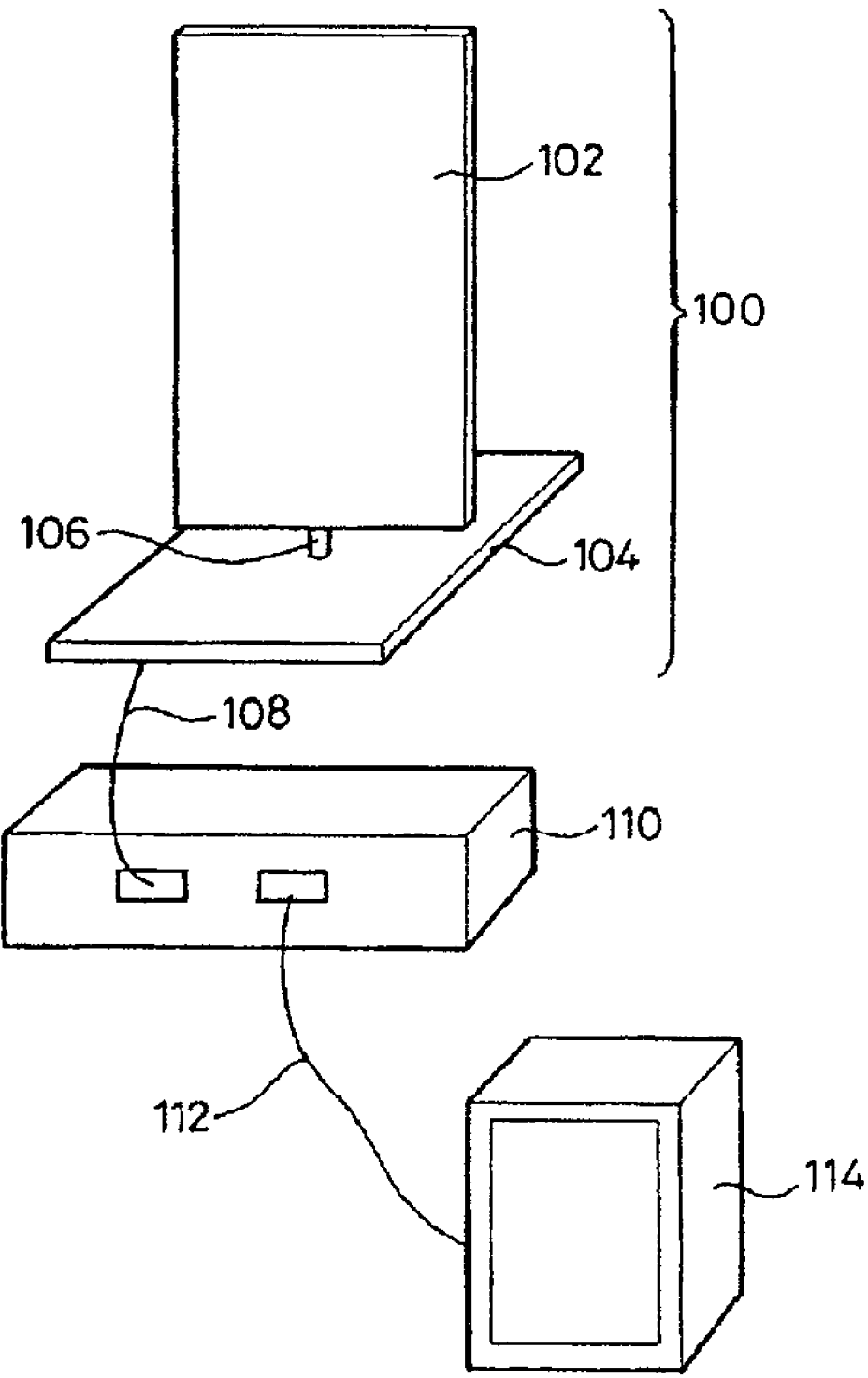

FIG_2
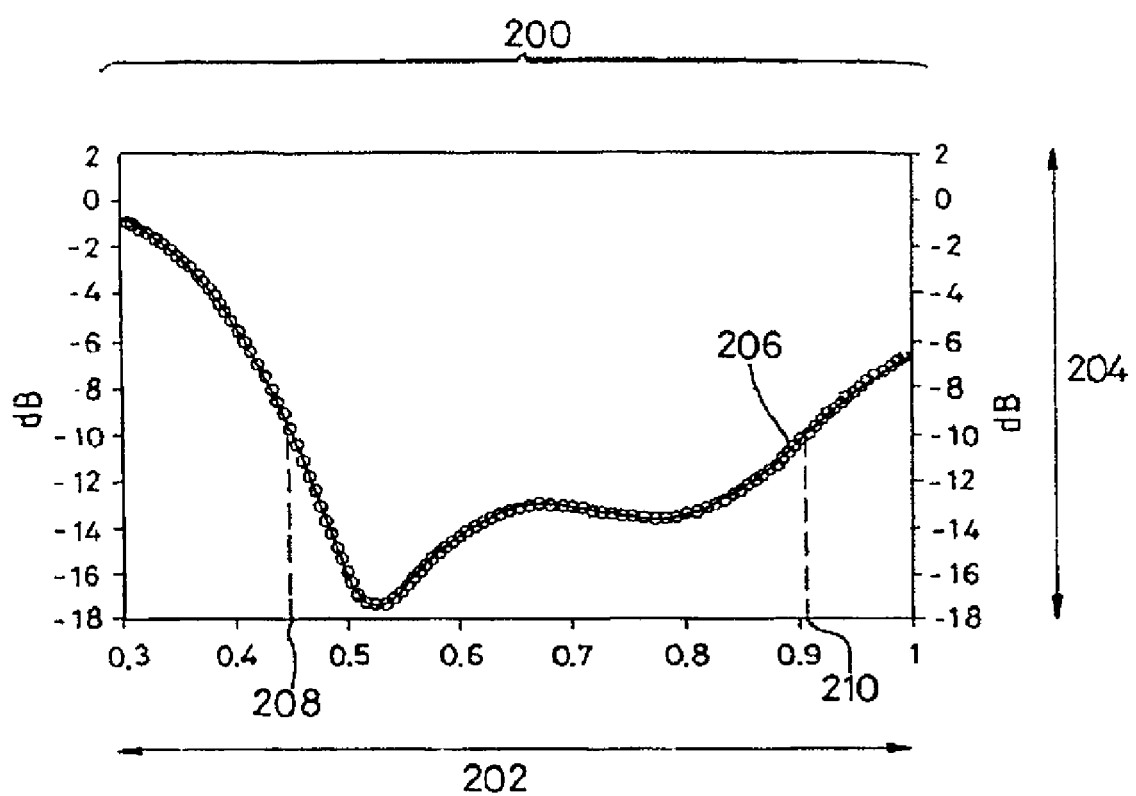

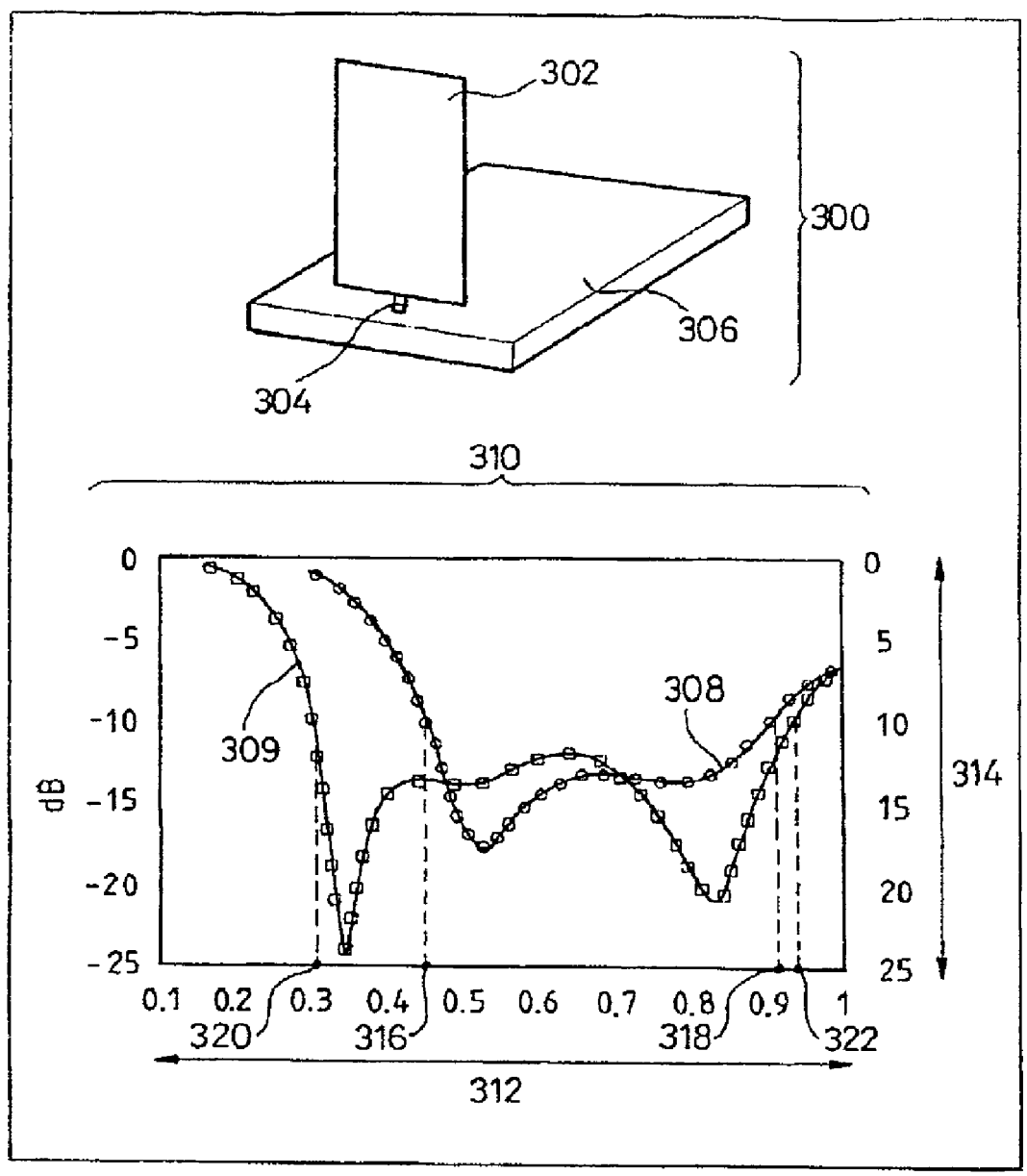

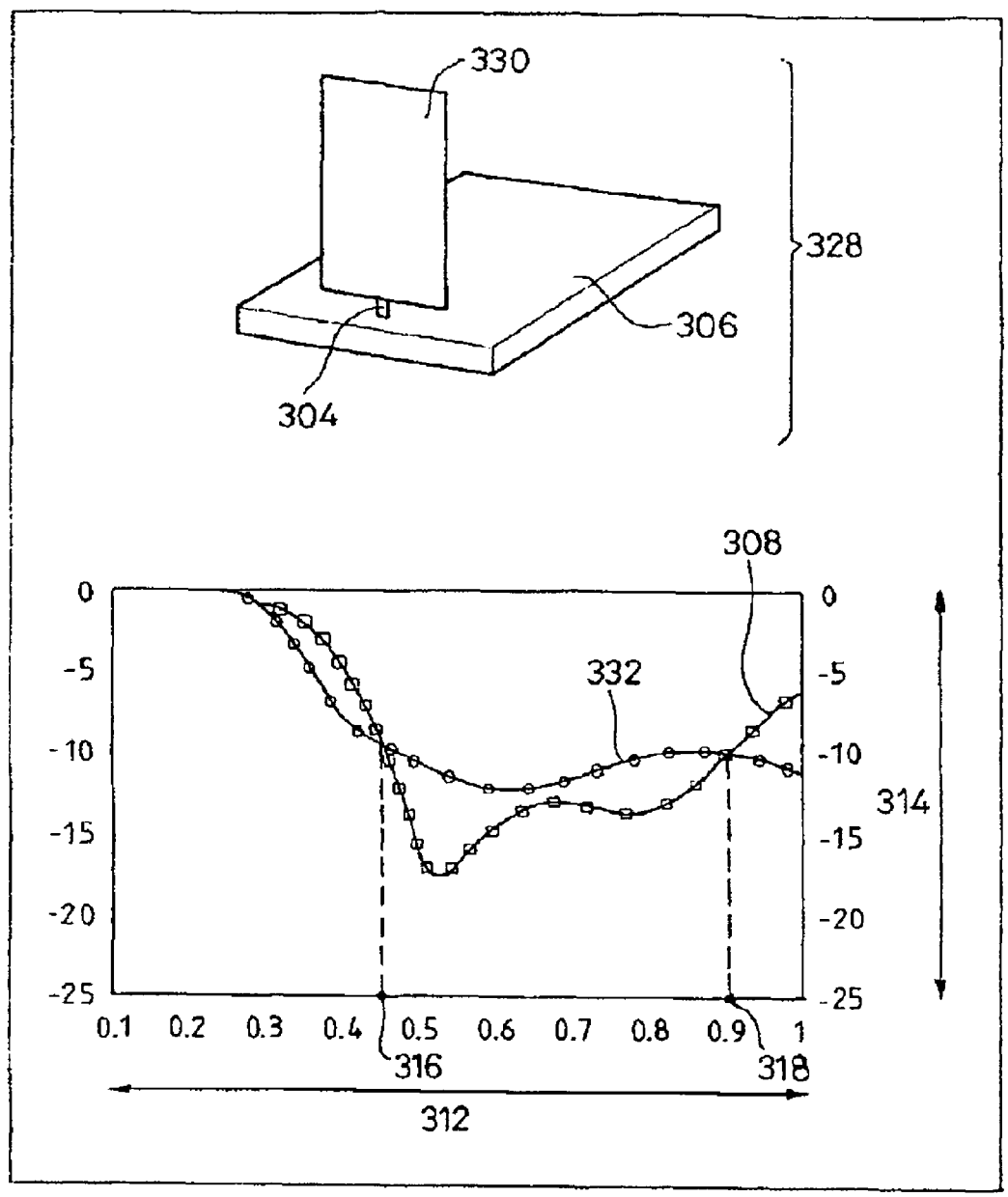
FIG_3b

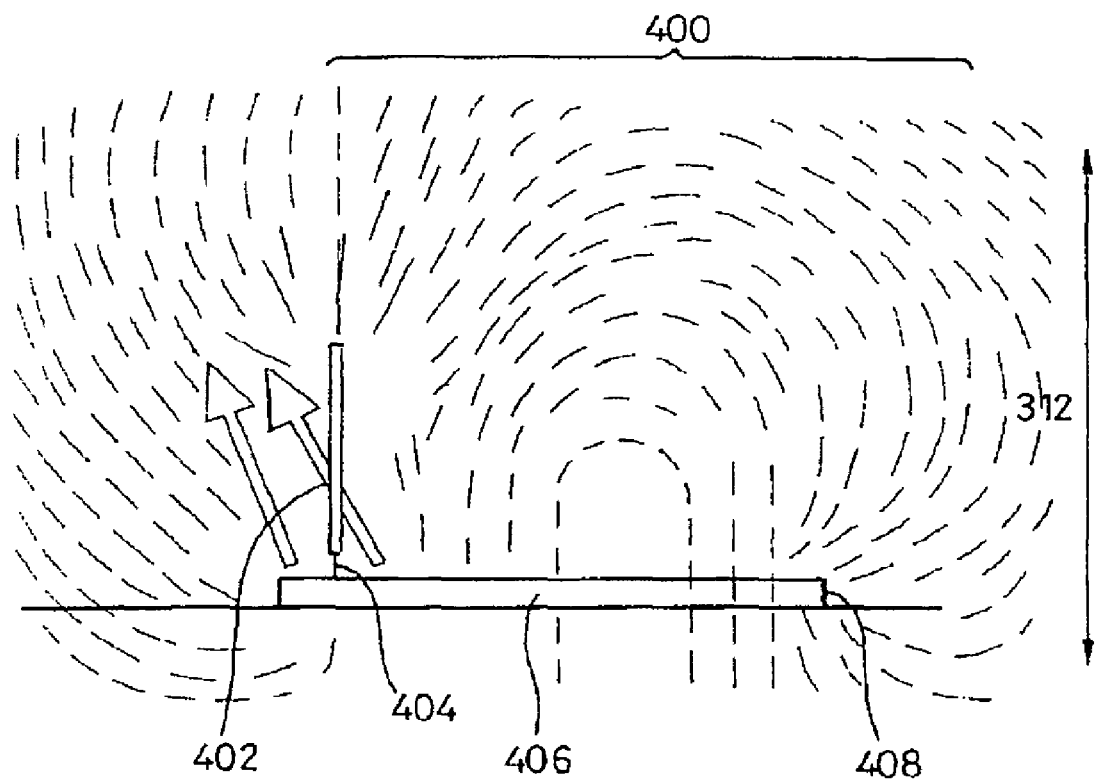
FIG_4

FIG_5
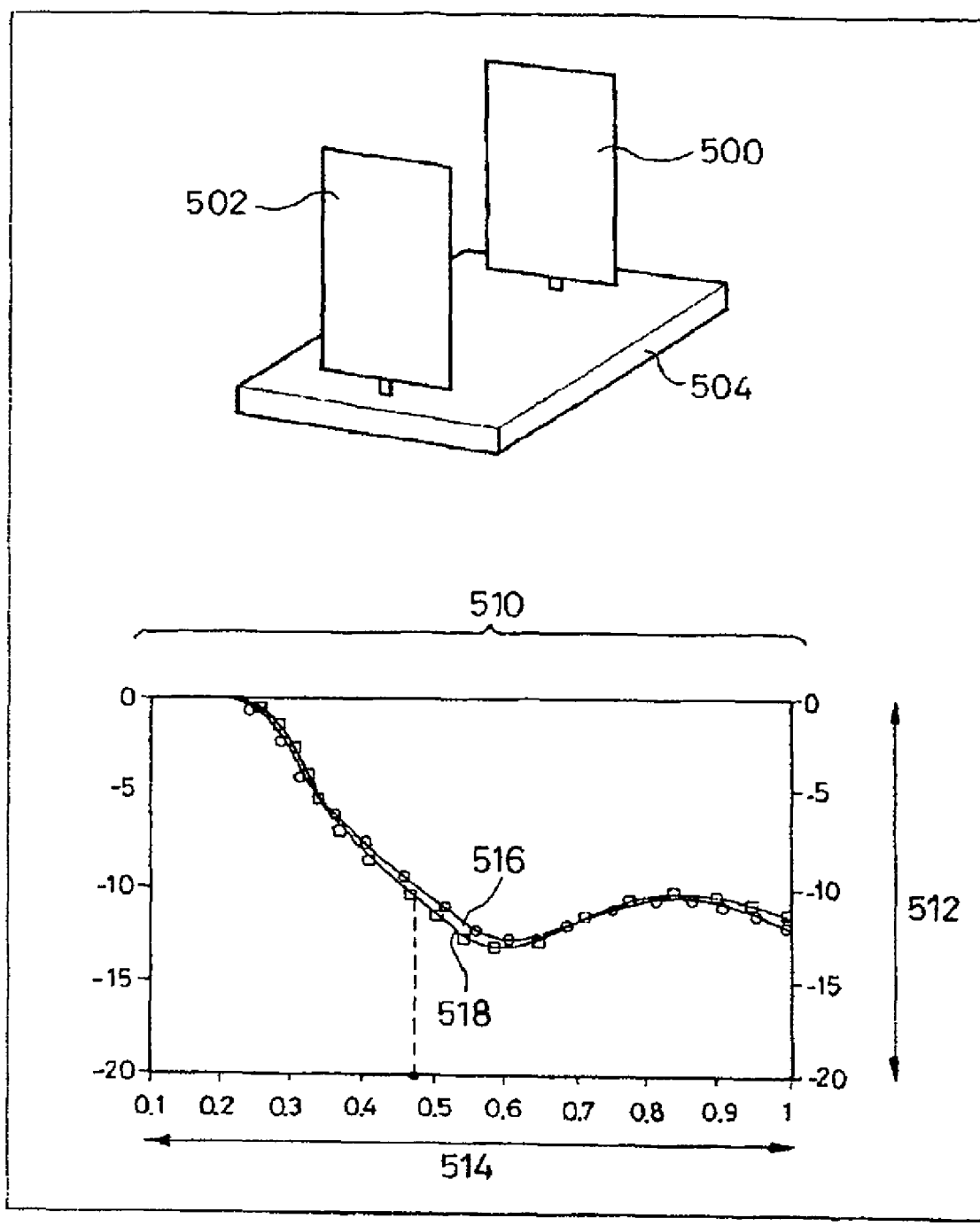

FIG_6a
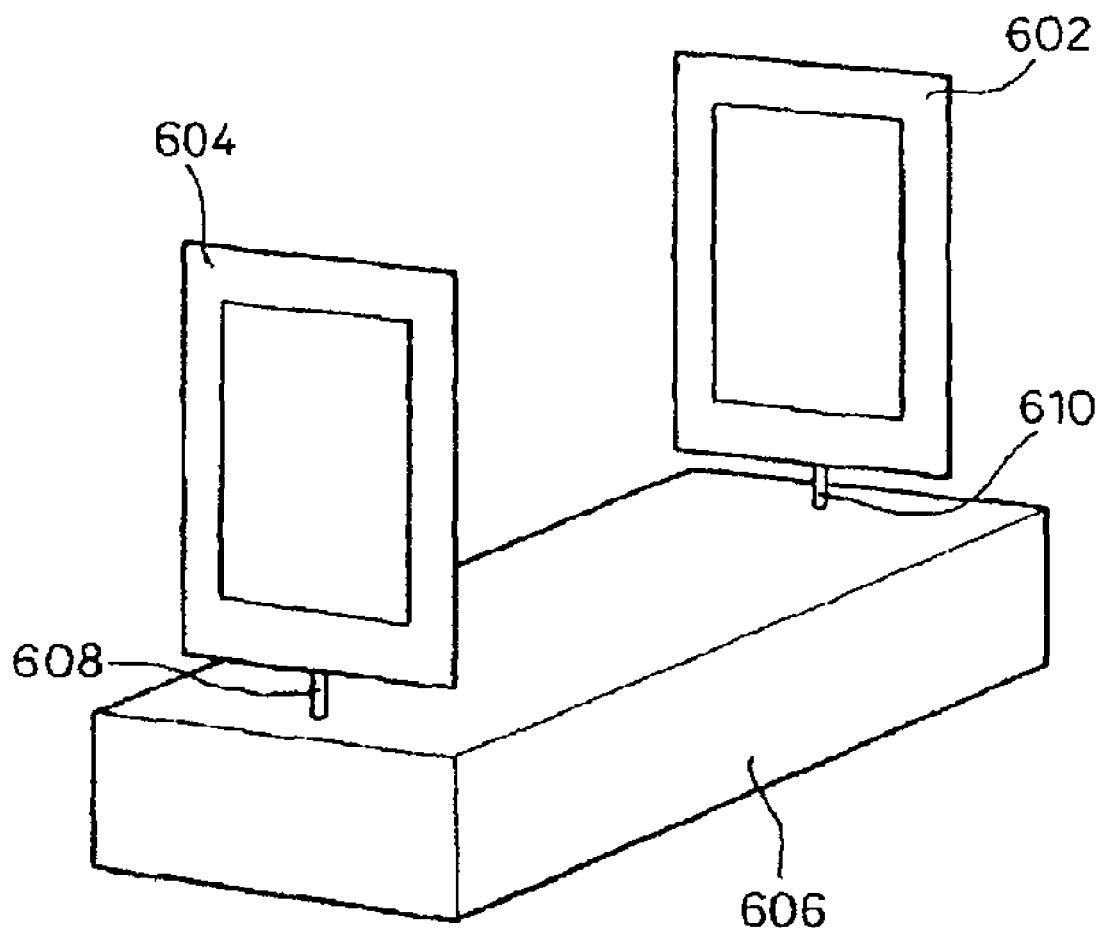

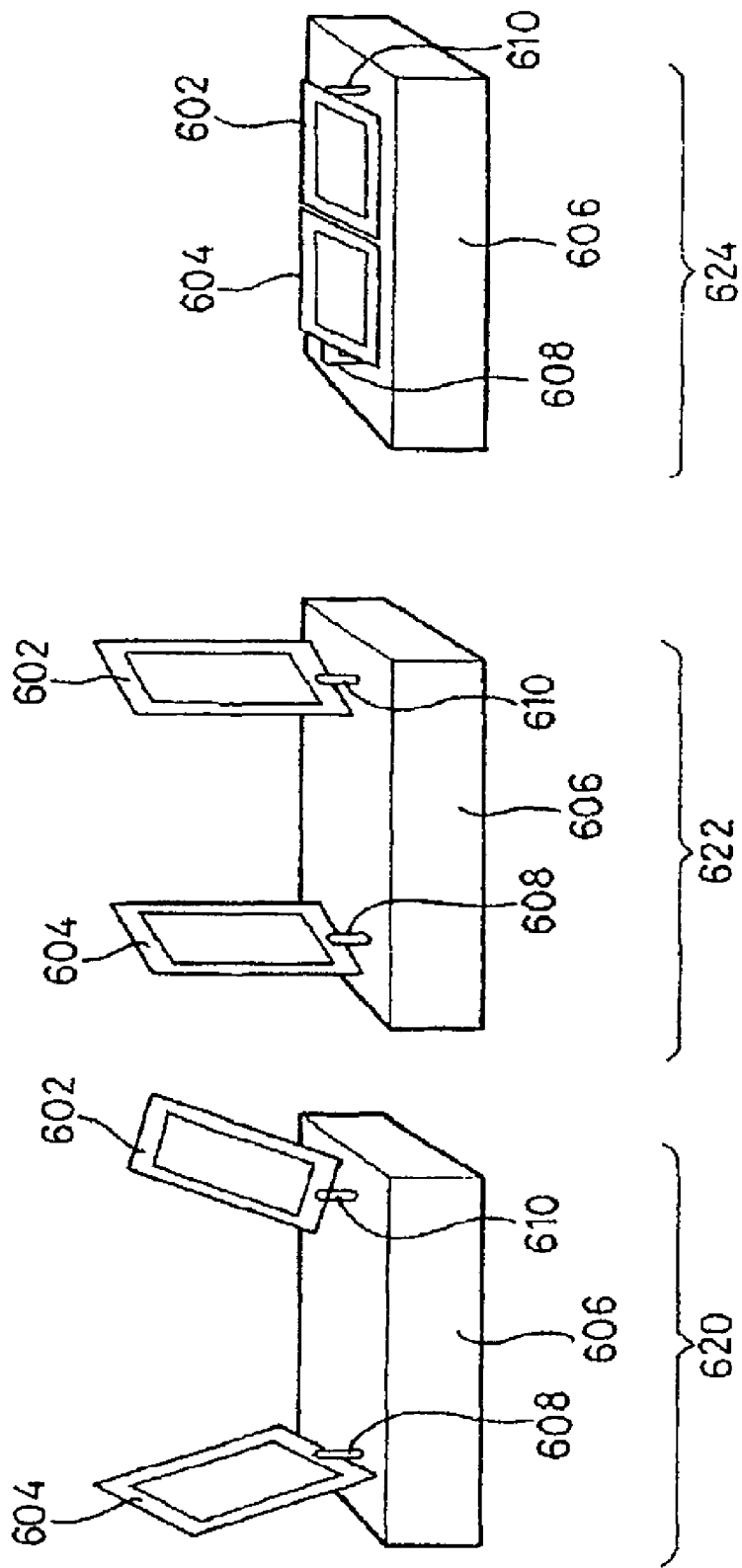

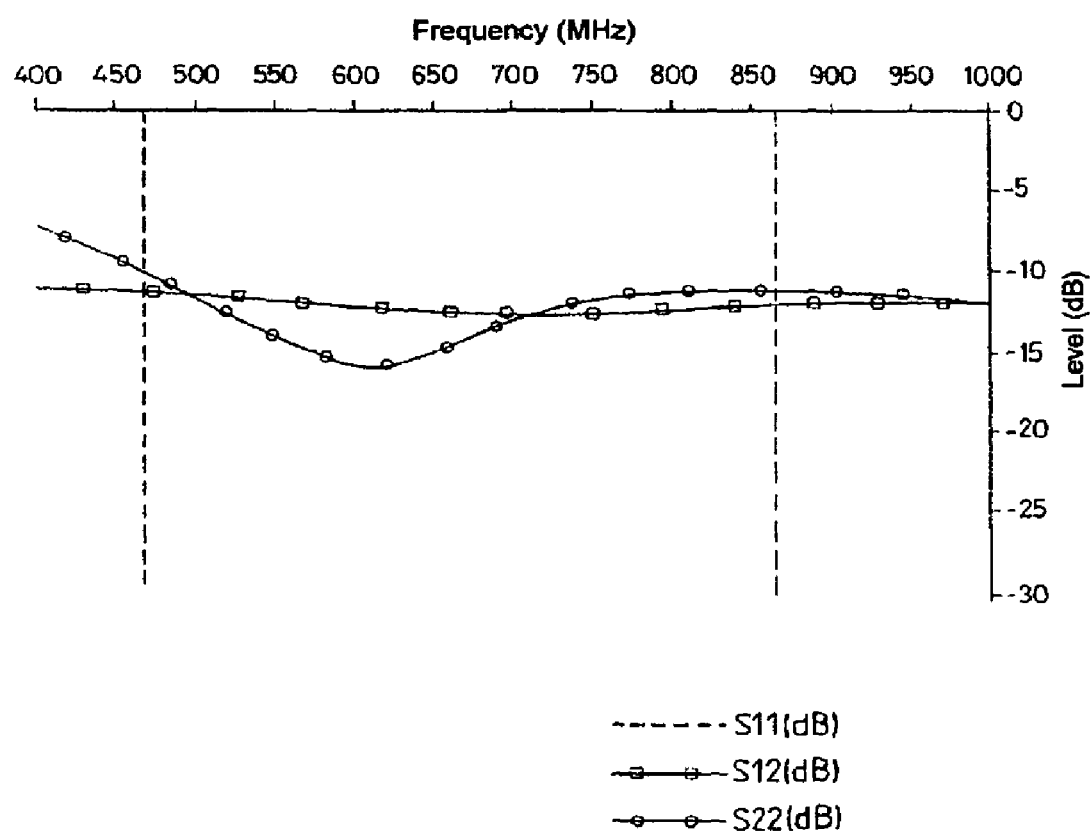
FIG_7a

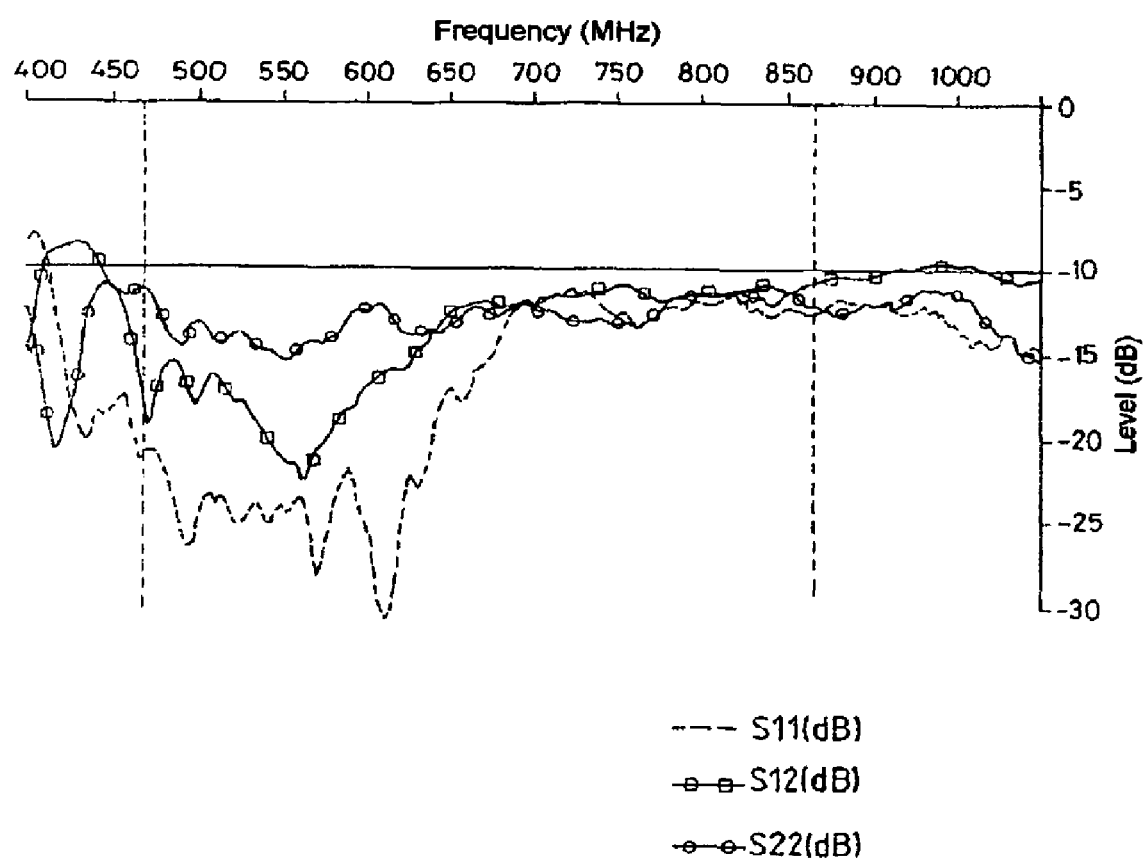

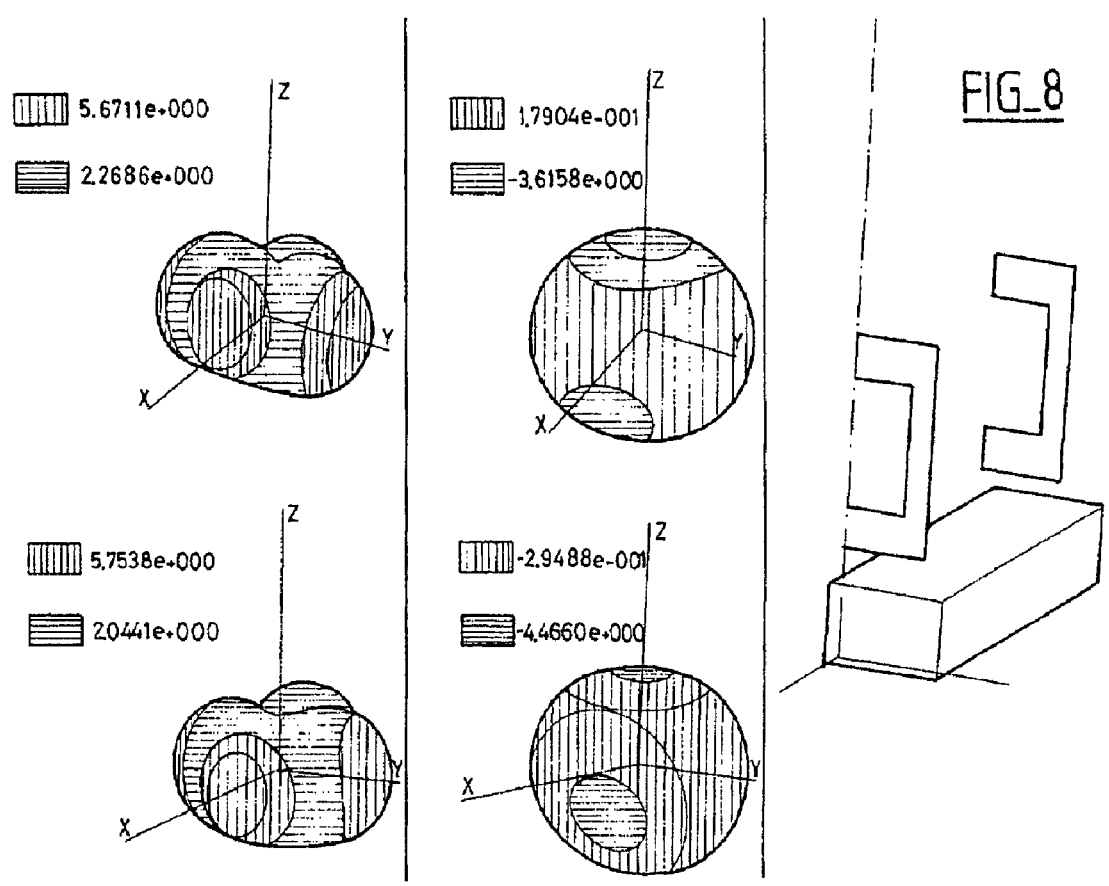

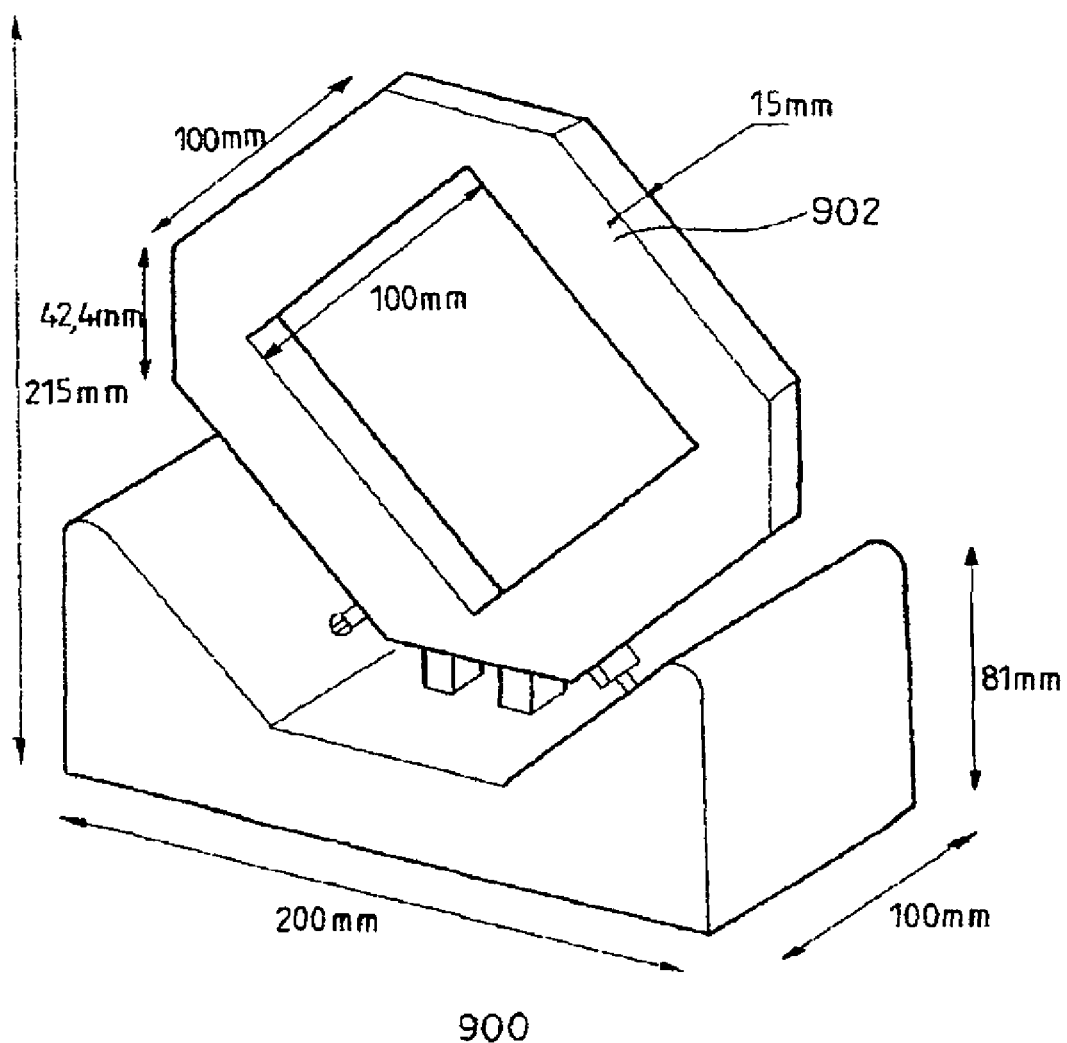
FIG_9

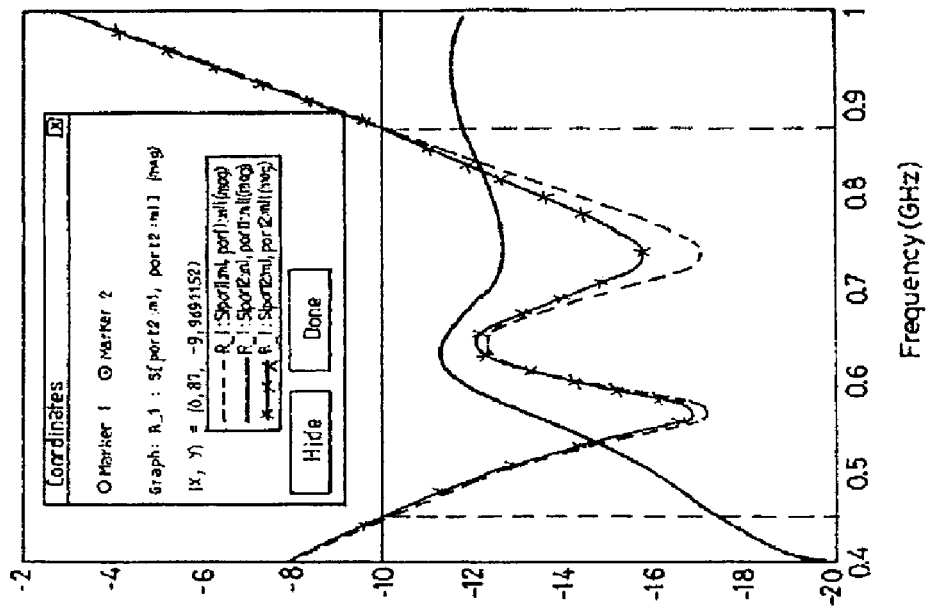
FIG_10

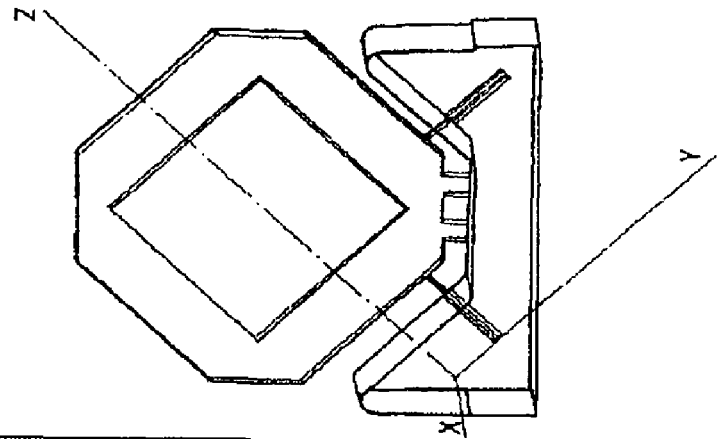
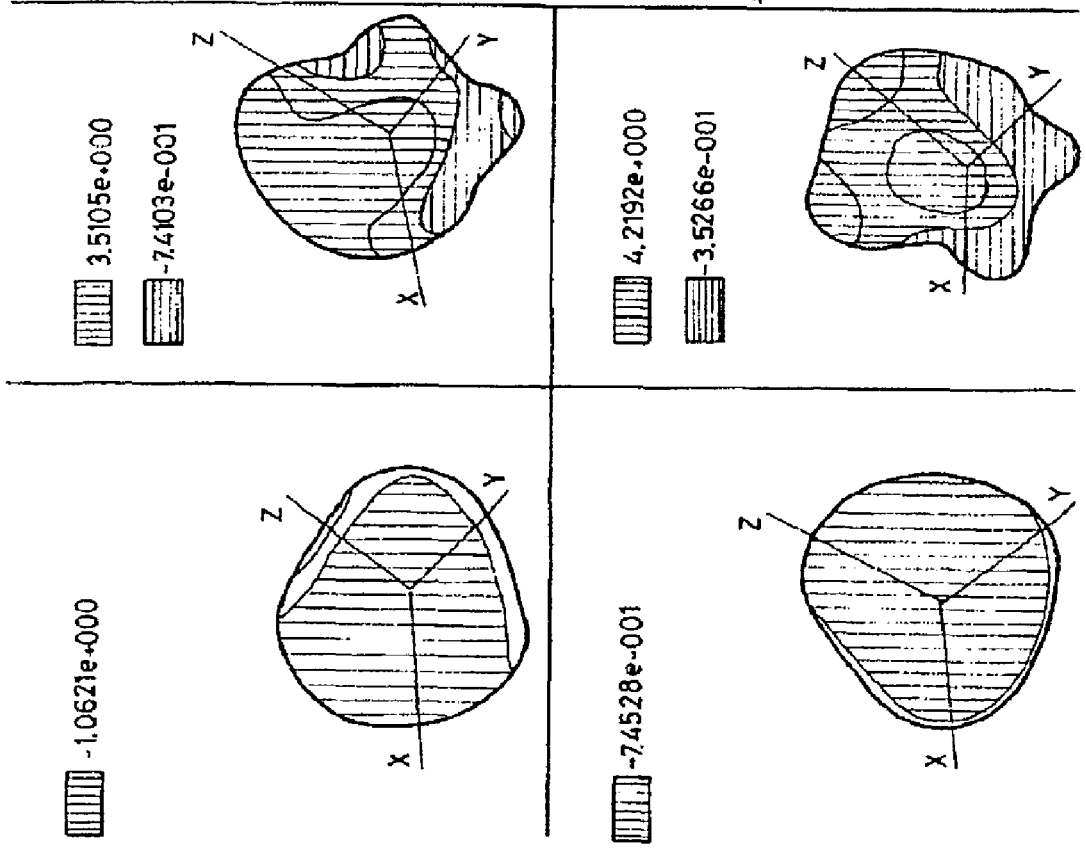
FIG_11

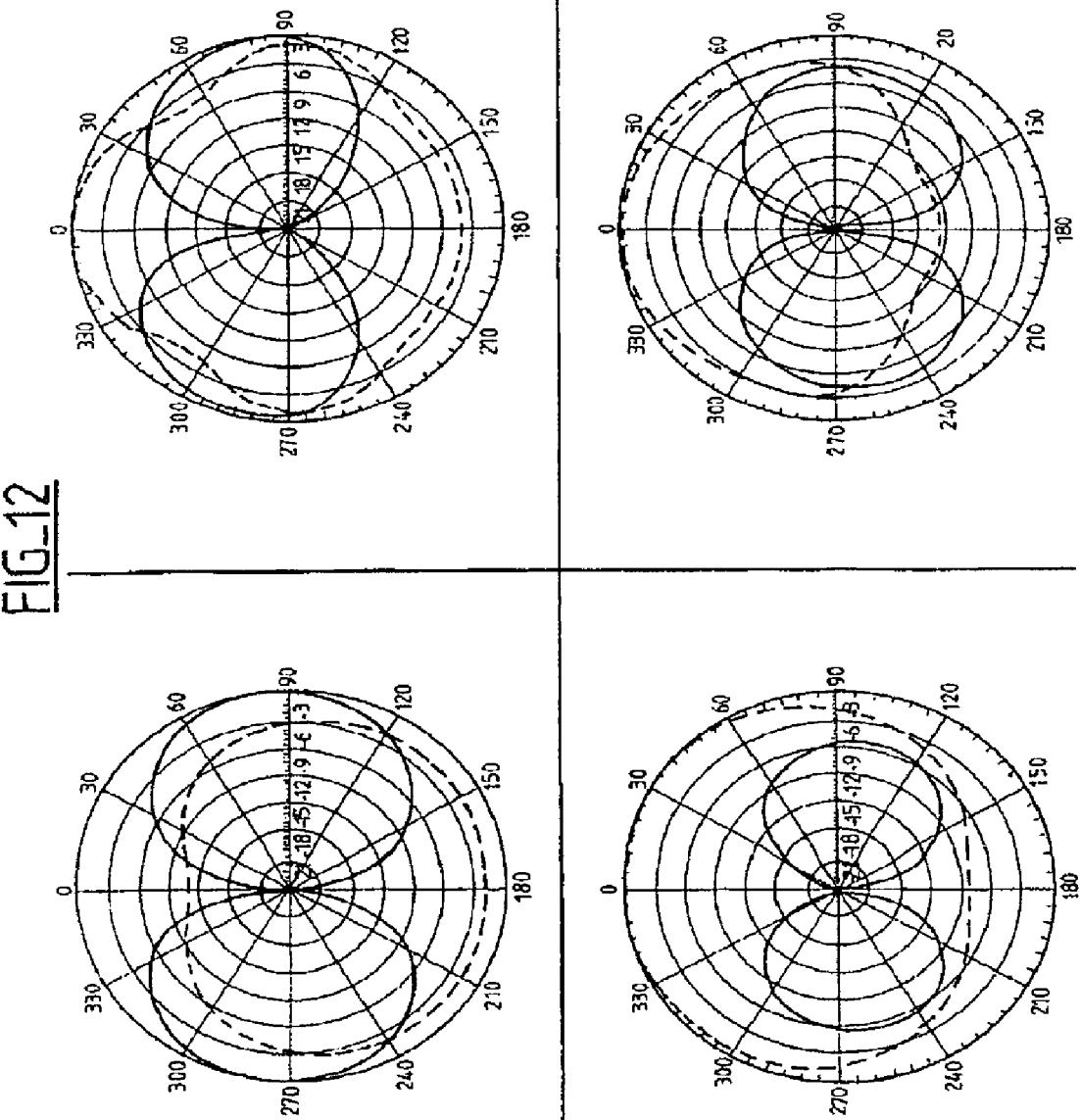
FIG_12

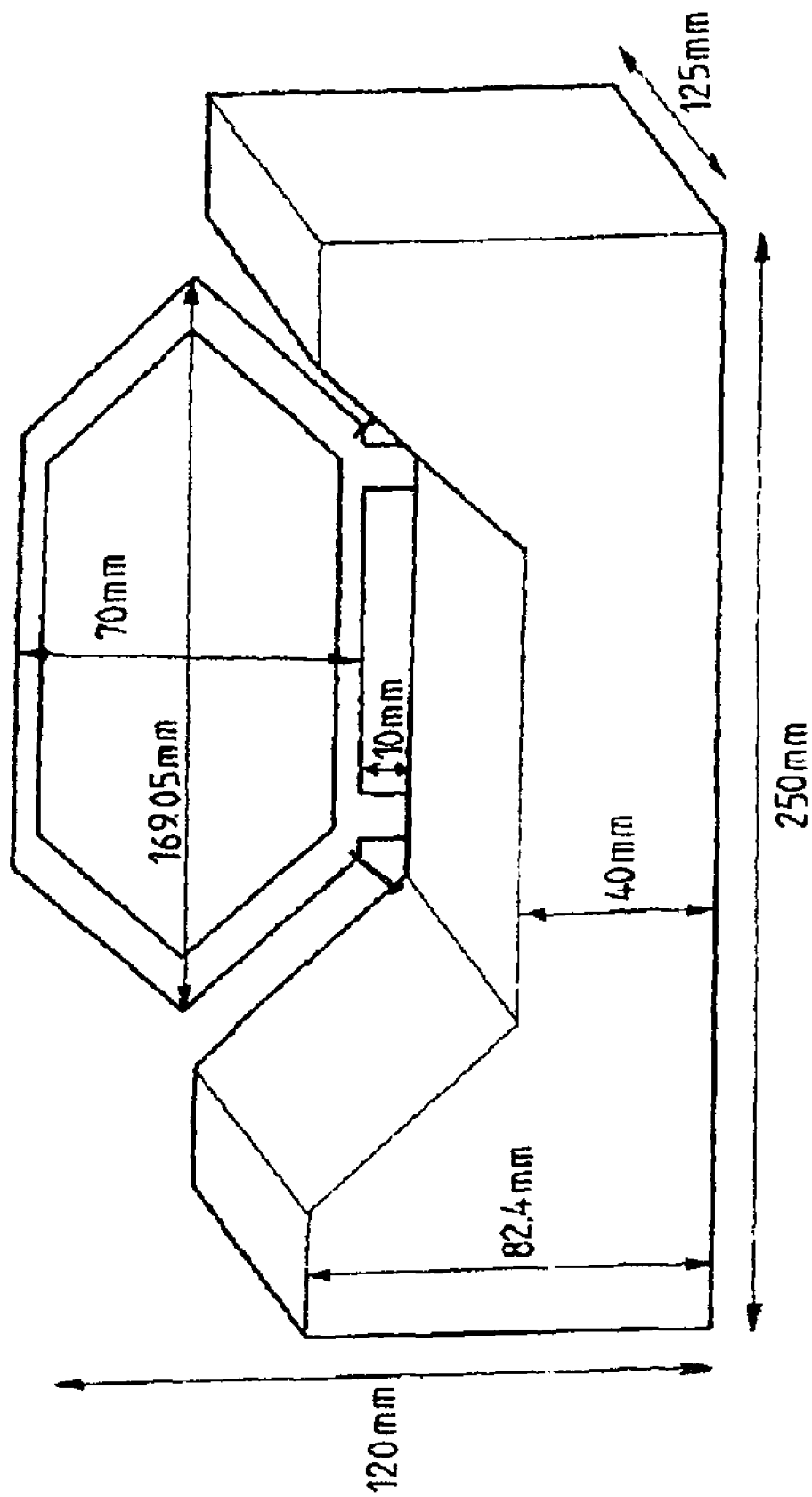
FIG_13

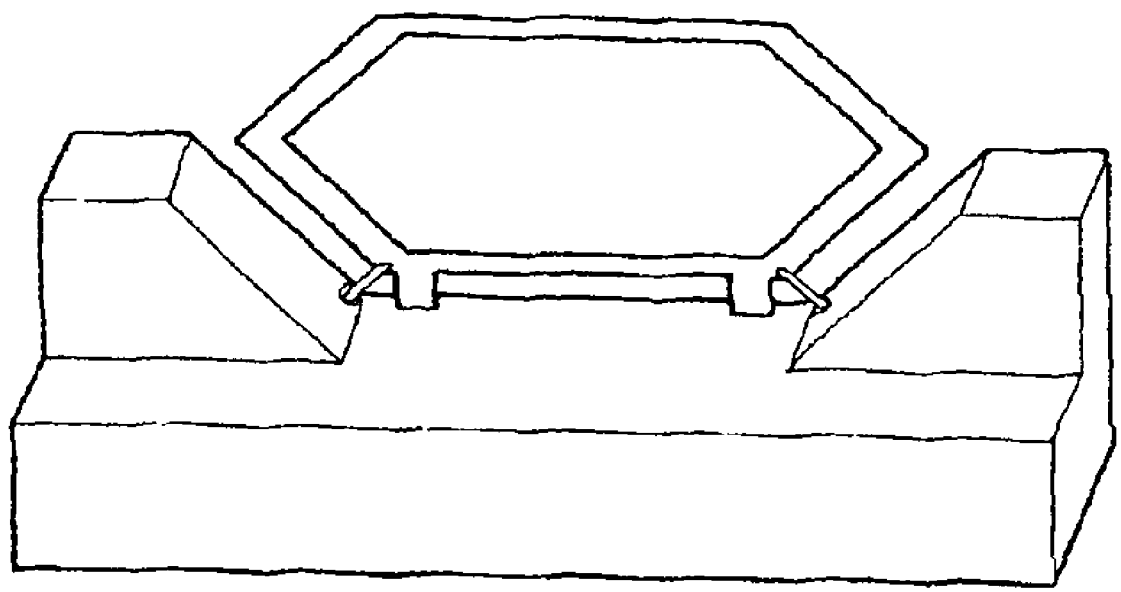
FIG_14

ELECTROMAGNETIC WAVE RECEPTION AND DECODING SYSTEM PROVIDED WITH A COMPACT ANTENNA

This application claims the benefit, under 35 U.S.C. §365 of International Application PCT/EP2005/051175, filed Mar. 15, 2005, which was published in accordance with PCT Article 21(2) on Oct. 6, 2005 in English and which claims the benefit of French patent application No. 0402955, filed Mar. 22, 2004.

The present invention relates to a system for receiving and decoding electromagnetic waves, which is provided with a compact antenna, especially by combining such a compact antenna with a decoder in the field of digital terrestrial television.

BACKGROUND OF THE INVENTION

The use of antennas is becoming increasingly widespread with the increase in methods of wireless information transmission. In particular, in the case of digital terrestrial television it is anticipated that there will be a substantial growth in the years to come thanks to wider offering of programmes than analogue television owing to the known advantages of digital modulation.

However, despite the robustness of the modulations that are used for digital terrestrial television, measurement campaigns have demonstrated considerable reception problems in the case of reception using a portable antenna.

This is because the transmitted signal for digital terrestrial television is digital and, unlike an analogue signal whose degradation is progressive, the digital image passes via a rapid transition from quality reception to complete loss of the image.

It is therefore important to provide technical solutions that allow quality reception not only for a fixed antenna, typically on the roof of a house or building, but also, and above all, for any reception configuration of a portable antenna.

SUMMARY OF THE INVENTION

The present invention results from the observation that such portable reception is achieved in general using an antenna placed near a decoder for processing the signals received by the antenna.

FIG. 1 shows schematically a monopole antenna 100 composed especially of a rectangular radiating element 102, a mast 106 and an earth plane 104. This antenna 100 works in a frequency range around a central frequency F in the UHF band (Ultra High Frequency) corresponding to a wavelength, denoted $\lambda$.

In this case, the dimensions of the radiating element 102 are a height of 175 mm and a width of 90 mm. The dimensions of the earth plane are 83 mm by 96 mm, i.e. of the order of $0.2\lambda$.

This antenna is connected to a decoder 110 via antenna/decoder connection means 108, these means 110 being composed in particular of conducting wires.

This decoder 110 receives the data delivered by the antenna 100, decodes it and sends it via decoder/television connection means 112 to a television set 114.

FIG. 2 is a plot 200 showing the curve 206 of the reflection coefficient (plotted on the y-axis 204 in dB) of the monopole antenna 100 as a function of the frequency (plotted on the x-axis 202 in GHz).

Since the frequency working range is that part of the curve below −10 dB, it may be seen that this monopole antenna is designed to operate within the UHF (Ultra High Frequency) band between the abscissa 208, i.e. 450 MHz, and the abscissa 210, i.e. 903 MHz. For example, the working band for an antenna dedicated to digital terrestrial television lies between 470 MHz and 862 MHz. In other words, such a monopole antenna 100 may be used within the context of digital terrestrial television.

However, it is important to find solutions that give more compact antennas and accessories that can be used in a domestic environment.

Now, antennas represent an exception to the general trend towards miniaturization observed in the electronics field. This exception is dictated by the laws of physics.

This is because, in the field of antennas, there is necessarily a compromise between, on the one hand, the maximum volume occupied by an antenna and, on the other hand, its radiation and bandwidth efficiency.

In fact, the overall size of an antenna is tied to the size of its radiating element, which depends on the wavelength corresponding to the operating frequency range of the antenna.

Therefore it is apparent that there is a problem in reducing the size of the radiating elements, and therefore the overall size of the antennas and their accessories, while still providing the said antennas with satisfactory electromagnetic performance.

In addition, these antennas and these accessories must be able to be correctly integrated into a limited environment, for example a domestic or professional environment.

However, it seems that the proposed modifications result in an appreciable increase in the cost of portable antennas and to an increase in the number of associated accessories.

This additional cost goes counter to the economic criteria of the digital terrestrial television market, which has to be a mass market in which the elements for subscribers must be as inexpensive as possible.

The present invention allows at least one of the abovementioned problems to be solved.

It relates to a data transmission system comprising an antenna provided with at least a monopole radiating element mounted on a conductive earth plane, characterized in that the radiating element is connected to the conductive surface of the earth plane through a mast located near an edge of said conductive surface.

Thanks to the invention, the portable antennas have improved performance in such a way that, for the same required level of performance, these antennas may be more compact while ensuring quality reception. The reduction in size of the radiating element is about 30%.

In addition, the number of particularly bulky and awkward accessories to be used (especially the connection means, including connection cables, and domestic retransmitters) is reduced.

According to one embodiment, since the radiating element is connected to the conducting surface via a mast fastened to the radiating element at its point of excitation, this point of excitation is off-centred with respect to the surface of the earth plane.

In one embodiment, the earth plane has at least one of its dimensions, such as its length, its width and/or its height, of the order of a multiple of $\lambda/2$ where $\lambda$ is a wavelength used by the antenna.

According to one embodiment, the system includes means so that its reflection coefficient is less than −10 dB in the operating frequency band.

According to another feature, the system includes a second radiating element mounted on the same conductive earth plane via a mast located near an opposite edge of said conductive surface.

In one embodiment, the antenna is provided with a hollowed-out radiating element.

According to one embodiment, the earth plane of the antenna corresponds to one face (for example the upper face) of a digital terrestrial television decoder.

In one embodiment, the system includes means for receiving and decoding transmitted signals within the context of digital terrestrial television, for example with a frequency lying between 470 and 862 MHz.

According to one embodiment, the antenna includes means for pivoting about a rotation mechanism with respect to the surface of the earth plane, especially so as to minimize its bulk for packing it and for stowing it.

BRIEF DESCRIPTION OF THE DRAWINGS

Other features and advantages of the invention will become apparent from the description given below by way of non-limiting illustration and with reference to the figures appended hereto, in which:

FIG. 1, already described, shows a known reception and decoding system with a monopole antenna;

FIG. 2, already described, shows the reflection coefficient as a function of the operating frequency of a known monopole antenna;

FIGS. 3a and 3b show schematically antennas and their corresponding reflection coefficient plot;

FIG. 4 shows schematically the electromagnetic field around the antenna;

FIG. 5 shows an antenna having two radiating elements and the corresponding reflection plot;

FIG. 6a shows an antenna composed of two radiating elements of the frame type, these being fixed to a casing;

FIG. 6b shows various positions of the antenna according to FIG. 6a with pivoted masts;

FIGS. 7a and 7b show measurements of parameters relating to the performance of an antenna according to the invention;

FIG. 8 shows electromagnetic characteristics of the frame antennas placed on the casing of the decoder;

FIG. 9 shows an alternative embodiment of the addition of a radiating element to the casing, called a polarization-diversity diamond antenna;

FIGS. 10, 11 and 12 show the electromagnetic characteristics of the diamond antenna variant;

FIG. 13 shows another variant in which an antenna is integrated into a casing, called a multiple-diversity antenna; and FIG. 14 shows a variant of the antenna of FIG. 9 with a smaller earth plane.

DETAILED DESCRIPTION OF PREFERRED EMBODIMENTS

FIG. 3a shows a monopole antenna 300 according to the invention, working in a frequency range whose central frequency corresponds to a wavelength $\lambda$, and a plot 310 of the reflection coefficient of the said antenna 300.

This antenna 300 consists of a radiating element 302 joined to an earth plane 306 via a mast 304. The mast 304 is located near an edge of the earth plane 306. This earth plane 306 has, in this embodiment, at least one of its dimensions, and especially its length, width and/or height, of the order of a multiple of $\lambda/2$.

The dimensions of the radiating element 302 are a height of 175 mm and a width of 90 mm. The dimensions of the earth plane 306 are 250 mm by 150 mm.

The plot 310 shows a curve 308, corresponding to the antenna 100 of the prior art, and a curve 309, corresponding to the antenna 300 according to the invention, the said curves 308 and 309 representing the variation in the reflection coefficient (plotted on the y-axis 314 in dB) as a function of the frequency (plotted on the x-axis 312 in GHz).

This shows that the matching frequency band passes from [450 MHz (corresponding to the abscissa 316)-903 MHz (corresponding to the abscissa 318)] in the case of the antenna 100 according to the prior art to [304 MHz (corresponding to the abscissa 320)-936 MHz (corresponding to the abscissa 322)] in the case of the antenna according to the invention thanks to the interaction between the earth plane 306 and the radiating element 302.

The bandwidth (reflection coefficient <−10 dB) goes from 66% to 102%. In other words, this bandwidth has therefore been increased by about 50%.

Moreover, it should be noted that the low frequency is reduced by 30%.

This interaction effect between the radiating element and the earth plane is illustrated more precisely in FIG. 4, which shows schematically an antenna 400 according to the invention seen from the side, consisting of a radiating element 402, seen on end, and of an earth plane 406, the length of which is of the order of a multiple of $\lambda/2$, connected to the radiating element 402 via a mast 404.

This FIG. 4 shows the field lines that are produced around the antenna 400. In fact, the electric field lines are established particularly between the radiating element 402 and the furthest edge 408 of the earth plane 406.

Consequently, the field lines are extended and allow operation at lower frequencies.

FIG. 3b shows an antenna 328 consisting of a small or compact radiating element 330 having dimensions of 120 mm in height and 60 mm in width (30% smaller than the radiating element 302) joined via the mast 304 to the same earth plane 306 as that of the antenna 300 (that is to say having dimensions of 250 mm by 150 mm).

It therefore becomes possible to reduce the dimensions of the radiating element 302 by about 30% in order to obtain the radiating element 330 and again operate in the UHF (Ultra High Frequency) frequency band of 470-862 MHz corresponding to digital terrestrial television.

This 30% reduction in the size of an antenna corresponds to the shift of the low frequency between the small radiating element 330 and the earth plane.

In the plot shown in FIG. 3b, the curve 332 represents the reflection coefficient of the antenna 328 (plotted on the y-axis 314 in dB) as a function of the frequency (plotted on the x-axis 312 in GHz).

By comparing this curve 332 with the curve 308 defined above, it may be seen that, thanks to the invention, an antenna has a 30% more compact radiating element than that of an antenna according to the prior art, while still maintaining the same operating frequency band.

FIG. 5 shows schematically that it is possible to place a compact radiating element 500 and another compact radiating element 502 on each side of the same earth plane in order to benefit the antenna diversity.

This is because the fact of having been able to place the antennas at the edge of the decoder allows the two antennas to be spaced apart by at least λ/4, making it possible to decorrelate the antennas for spatial diversity.

The diagram 510 shows the curves 516 and 518, which are practically superposed in the case of the two radiating elements 500 and 502, of the reflection coefficient (plotted on the y-axis 512 in dB) of the two antennas as a function of the frequency (plotted on the x-axis 514 in GHz).

To make the whole assembly more compact, it is possible to use a frame antenna, that is to say an antenna provided with a hollowed-out radiating element, such as a monopole antenna, since frame radiating elements are more compact (smaller external dimensions) than solid radiating elements for the same electromagnetic characteristics.

It is possible to use as earth plane of the antenna one face (for example the upper face) of a digital terrestrial television decoder and thus be able to fasten the radiating elements to the decoder, while still benefiting from the synergy between the radiating element(s) and the face of the decoder.

This fastening results in another substantial increase in compactness and reduction in cost (especially by reducing the number of accessories, such as the connection means between the radiating element(s) and the casing of the decoder, and a reduction in packaging and transport costs) as in this way a signal reception means/decoder assembly that is compact and made as a single part is created.

This invention is capable of numerous variants. Thus, three variants that incorporate the dimensions of a standard digital decoder are proposed below.

The same casing dimensions are maintained for the first variant, whereas for the second and third variants it is necessary to substantially modify the upper cover of the decoder.

The fundamental idea is to take account of the size constraints of the decoder and to produce solutions for antennas that fit onto this casing so as to provide only a single one-piece antenna/decoder product.

FIG. 6a shows an antenna 600 that allows two-dimensional spatial diversity as the two radiating elements 602 and 604 are placed on either side of the casing along its longest length.

This variant incorporates a decoder casing having the dimensions of 250×125×40 mm, the total height of the antenna incorporating the casing is 160 mm, the radiating element, with a thickness of 0.3 mm, is made from a sheet of metal, and the two radiating elements are spaced apart by 21 cm, i.e. λ/2 at 714 MHz.

Consequently, compared with a theoretical approach, the spatial diversity is not optimal (the distance between the two antennas >λ/2) between 470 and 700 MHz.

The antenna can then pivot about a 0-90° rotation mechanism in order to minimize its volume, in particular for packing it and for stowing it.

The distance between the antenna and the casing allows the antenna to be fitted very simply, thus eliminating a matching circuit. At this stage, it should be noted that the matching of the ports is directly to 50 ohms, this being advantageous in respect of the associated amplification chain.

As regards overall size, we have:
total height: 160 mm;
floor area: 250×125 mm;
thickness of the radiating element: 0.3 mm.

FIG. 6b shows that, with pivoted masts 608 and 610, it is possible to have three positions of the radiating elements 602 and 604 relative to the casing 606:
a position 620 called the spatial polarization diversity operating position;
a position 622 called the spatial diversity operating position; and
a position 624 called the packaged position for making it easier to transport or to stow the casing/antenna assembly.

FIG. 7a shows a simulation of various operating parameters, namely a matching level S11, an inter-antenna isolation S12 and a matching level S22 for a digital terrestrial reception antenna or DTTVR (Digital Terrestrial TV Reception) and FIG. 7b shows the measurements of these parameters.

In these FIGS. 7a and 7b it may be seen that, from the radiofrequency standpoint, an antenna according to the invention is matched to the required performance (−10 dB) over the operating band (470-862 MHz) without the addition of a matching circuit.

The isolation between the two ports is better than 10 dB. This is mainly due to the physical separation between the two antennas.

FIG. 8 illustrates the radiation plots, in dB, at 860 MHz and at 470 MHz for the port 802 and for the port 804 of a system according to the invention, shown partly in cross section.

It will be noted that the radiation plots for ports No. 1 and No. 2 are virtually identical at a given frequency. The directivity varies from 1.7 dBi at 470 MHz to 7.5 dBi at 860 MHz.

Another, 0-135°, re-rotation mechanism would also allow the spatial diversity to have a polarization diversity over the entire 460-862 MHz band.

Another embodiment variant of the addition of a radiating element to the casing is called a polarization-diversity diamond antenna. This is shown in FIG. 9.

To produce this variant, it is necessary for the upper cover of the casing 900 of the decoder to be substantially modified.

This antenna allows polarization diversity of order 2 (two ports at 90° with respect to each other) with a decoder casing 900 having dimensions of 200×100×30 mm, the overall height of 81 mm indicated taking into account the 30 mm of the casing.

Matching requires a cell between the radiating element 902 and the amplification chain. This cell must present a load of 100+j90 ohms.

With regard to the overall size, the system has the following dimensions:
total height: 215 mm;
thickness of the radiating element: 15 mm, it being possible for this thickness to be made of metalized foam.

To determine the dimensions of the antenna accurately, it is also possible to consider that:
the isolation between the two ports is improved by placing two short circuits between the ports;
placing the short circuit close to the port increases the isolation to the detriment of the bandwidth;
the thickening of the radiating element improves its bandwidth; and
extending the oblique part upwards increases the bandwidth.

A major advantage as regards the conformation of the casing cover lies in the possibility of easily placing two decoder tuners vertically in this casing.

The electromagnetic characteristics of this antenna, illustrated in FIGS. 10, 11 and 12, show that this antenna is matched to the 470-860 MHz band (matching to 100+j90 ohms) and that the isolation between the two ports is better than 11 dB.

The radiation plots for the ports No. 1 and No. 2 of this antenna are complementary, thus allowing total coverage of the space.

The directivity varies from 2.6 dBi at 470 MHz to 5.7 dBi at 860 MHz. As shown in FIG. 12, the diversity is provided by the polarization both at 470 MHz and at 860 MHz. This is because, in the φ=0° plane for example, the excitation of port No. 1 shows, within a certain aperture, a majority of $E\_\theta$ whereas the excitation of port No. 2 shows a majority of $E\_\phi$.

Another variant in which an antenna is integrated on a casing, especially the casing of a decoder, is shown in FIG. 13. This is called a multiple-diversity antenna.

This antenna with a polarization diversity of order 2 (two ports at 90° to each other) is integrated into a decoder casing with dimensions of 250×125×40 mm. The total height of the antenna including the casing is 120 mm.

The radiating element, with a thickness of 0.3 mm, may be made of cut metal sheet. The radiating element located at the bottom of the casing may thus be fastened to the chassis and manufactured at the same time.

The size of the antenna takes the following characteristics into account:
- the isolation between the two ports is improved by placing two short circuits between the ports;
- placing a short circuit close to the port increases the isolation to the detriment of the bandwidth;
- the thickness of the radiating element improves its bandwidth;
- extending the oblique portion upwards increases the bandwidth.

This antenna is matched to the 470-860 MHz band (matching to 17+j45 ohms). To do this, the antenna must be matched just at the start of the coaxial cable. The isolation between the two ports is better than 17 dB.

Various measurements have shown that, as regards the electromagnetic characteristics of this antenna variant associated with a casing, called a multiple-diversity antenna, the radiation plots corresponding to ports No. 1 and No. 2 cover, at 860 MHz, two different regions of space and are virtually identical at 470 MHz. There therefore exists plot diversity at the high frequencies of the UHF band.

Moreover, the fact of having shifted the radiating element towards the bottom of the casing causes a displacement of the plot towards the rear of the casing in such a way that the directivity varies from 2.5 dBi (470 MHz) to 8.3 dBi (860 MHz).

In order to show that there does also exist a polarization diversity, the components of the field E along the x, y and z axes have to be observed. It is also necessary to consider that, if the component of the field E is predominately along an axis (i) compared with the other two axes (j, k), then the polarization is along this axis (i).

In this way, to say that an antenna has polarization diversity, one component of the field E corresponding to the first port is predominant along an axis (i) and a component of the field E that corresponds to the second port is predominant along another axis (j or k).

The orientation direction of the polarizations of the antenna may be extracted, which clearly shows that there exists a polarization diversity:

|  | 470 MHz | 860 MHz |
| --- | --- | --- |
| Port 1 | Polarization along the Y axis | Polarization along the Z axis |
| Port 2 | Polarization along the Z axis | Polarization along the Y axis |

In one variant of the invention, the cover is thus modified in such a way that only one third of the protuberance close to the antenna is left, it being possible for the remainder of the protuberance to be omitted and/or smoothed out, if necessary, as shown in FIG. 14.

The invention claimed is:

1. Data transmission system comprising an antenna provided with at least a monopole radiating element mounted on a conductive earth plane, wherein the radiating element is connected to the conductive surface of the earth plane via a mast, wherein said mast is located near an edge on said conductive surface and wherein said mast is fastened to the radiating element at its point of excitation, whereby this point of excitation is off-centered with respect to the surface of the earth plane, and wherein said radiating element has a planar shape and is substantially vertically arranged with respect to the conductive surface of the earth plane.

2. A system according to claim 1, wherein the earth plane has at least one of its dimensions, such as its length, its width and/or its height, of the order of a multiple of .lamda./2 where .lamda. is a wavelength used by the antenna.

3. A system according to claim 1, wherein it includes means so that its reflection coefficient is less than −10 dB in the operating frequency band.

4. A system according to claim 1, wherein it includes a first compact radiating element and a second compact radiating element mounted on the same conductive earth plane via masts located on separate edges of said earth plane.

5. A system according to claim 1, wherein the antenna is provided with a hollowed-out radiating element.

6. A system according to claim 1, wherein the earth plane of the antenna corresponds to one face of a digital terrestrial television decoder.

7. A system according to claim 1, wherein it includes means for receiving and decoding transmitted signals within the context of digital terrestrial television within the frequency band lying between 470 and 862 MHz.

8. A system according to claim 1, wherein the antenna includes means for pivoting about a rotation mechanism with respect to the surface of the earth plane.

* * * * *